(12) United States Patent
Guillon et al.

(10) Patent No.: US 9,531,974 B2
(45) Date of Patent: Dec. 27, 2016

(54) TWO-LINE, SHARED PIXEL LINEAR IMAGE SENSOR (75) Inventors: Marie Guillon, Grenoble (FR); Thierry Ligozat, Quaix en Chartreuse (FR)

(73) Assignee: E2V SEMICONDUCTORS, Saint-Egreve (FR)

( * ) Notice: Subject to any disclaimer, the term of this patent is extended or adjusted under 35 U.S.C. 154(b) by 222 days.

(21) Appl. No.: 13/984,483

(22) PCT Filed: Feb. 10, 2012

(86) PCT No.: PCT/EP2012/052267
§ 371 (c)(1),
(2), (4) Date: Aug. 8, 2013

(87) PCT Pub. No.: WO2012/107542
PCT Pub. Date: Aug. 16, 2012

(65) Prior Publication Data
US 2013/0314572 A1 Nov. 28, 2013

(30) Foreign Application Priority Data

Feb. 10, 2011 (FR) ...................................... 11 51097

(51) Int. Cl.
*H04N 3/14* (2006.01)
*H04N 5/335* (2011.01)
(Continued)

(52) U.S. Cl.
CPC ............ *H04N 5/3743* (2013.01); *H04N 5/347* (2013.01); *H04N 5/3745* (2013.01)

(58) Field of Classification Search
CPC ..... H04N 5/347; H04N 5/2743; H04N 5/3745
(Continued)

(56) References Cited

U.S. PATENT DOCUMENTS 6,906,749 B1   6/2005  Fox
7,268,815 B1 *  9/2007  Meynants ..................... 348/294
(Continued)

FOREIGN PATENT DOCUMENTS

EP   1195985 A1   4/2002
EP   2109223 A2   10/2009
(Continued)

OTHER PUBLICATIONS

International Search Report for PCT/EP2012/052267.
(Continued)

*Primary Examiner* — Antoinette Spinks
(74) *Attorney, Agent, or Firm* — Hauptman Ham, LLP (57) ABSTRACT The invention relates to image sensors of scanner type observing one image line at a time. According to the invention, only two lines of pixels are used, operating in TDI mode (summation of the charge of two pixels seeing the same image point successively) but using active pixels with a charge-voltage conversion within the pixel. The pixels of like rank of the two lines each use a photodiode and a charge storage node with a transfer gate adjacent to the photodiode and to the storage node for transferring the charge accumulated in the photodiode to the charge storage node. The storage node is shared between the two pixels of like rank, and the charge of the two photodiodes is transferred successively into this node before the reading of the potential taken by the node. The time interval which separates the two charge transfers corresponds substantially to the time which separates the transit of an image line past the first line of pixels and then past the second.

8 Claims, 4 Drawing Sheets (51) Int. Cl.
*H04N 5/374* (2011.01)
*H04N 5/347* (2011.01)
*H04N 5/3745* (2011.01)

(58) Field of Classification Search
USPC .................................... 348/308, 300, 295
See application file for complete search history.

(56) References Cited

U.S. PATENT DOCUMENTS

2010/0134648 A1\* 6/2010 Funatsu et al. ............ 348/222.1
2010/0134673 A1   6/2010 Masuda
2010/0213351 A1\* 8/2010 Iwamoto ........... H01L 27/14609
                                                  250/208.1

FOREIGN PATENT DOCUMENTS

| FR | 2906080 A1 | 3/2008 |
| JP | 11266403 A | 9/1999 |
| JP | 2006080937 A | 3/2006 |
| JP | 2009033520 A | 2/2009 |
| JP | 2010199989 | 9/2010 |
| WO | 0169284 A1 | 9/2001 |

OTHER PUBLICATIONS

English Translation of Office Action for Japan Patent Application No. 2013-552963, dated Dec. 15, 2015.
English Translation of Office Action for Japan Patent Application No. 2013-552963, mailed Aug. 9, 2016.

\* cited by examiner

TWO-LINE, SHARED PIXEL LINEAR IMAGE SENSOR

FIELD

The invention relates to image sensors, and more particularly to linear image sensors intended to observe one image line at a time, in scanner mode. These sensors gather a complete image of an object or of a scene by making the object or the scene move past the sensor at constant speed and by reconstructing the image by juxtaposition of the observed lines.

BACKGROUND

These sensors are used notably for the industrial inspection of products placed on a conveyor belt. Other applications are possible in the field of space observation for example.

One of the problems to which it is desired to afford a solution is the obtaining of an image signal of sufficient amplitude even when the relative movement of the object with respect to the sensor is very fast. It is indeed understood that if the movement is fast, the light integration time must be very brief, failing which the image would have only very poor resolution in the direction of the movement. But if the integration time is very brief, few photons are gathered by the pixels of the sensor. Active-pixel MOS technology is preferred because notably of the compatibility that it allows between the manufacture of the pixels proper and the manufacture of the peripheral electronic circuits which serve to control the sensor and to process the electronic image gathered.

Moreover, to improve the signal/noise ratio of the readout of an image, it has heretofore long been proposed to use multilinear strips operating by movement and signal integration (known as TDI sensors, the acronym standing for "Time Delay Integration") in which an image of a line of points of an observed scene is enhanced through the addition of successive images taken by N photosensitive lines observing one and the same line of the scene successively as the scene moves past the sensor.

At constant exposure time, the sensitivity is improved in the ratio of the number N of lines. The signal-to-noise ratio is improved in a ratio that can range from the square root of N to N.

The production of a TDI sensor by CCD technology is relatively easy: the addition of the signals point-by-point is done simply by emptying into a line of pixels the charge generated and accumulated in the previous line, in synchronism with the relative displacement of the scene and of the sensor. The last line of pixels, having accumulated N times the charge engendered by the observed image line, may be read out.

The production of a TDI sensor by MOS technology is more difficult; it involves the production of pixels with multiple gates operating by transferring charge in the manner of CCD sensors but with a different technology exhibiting risks of poor transfers from one pixel to the next. These pixels are not active pixels, they comprise only charge storage and transfer means but no means for charge-voltage or charge-current conversion inside the pixel.

It may be pointed out moreover that the use of sensors with multiple lines of pixels may pose problems in the case of poor synchronization or of poor regularity of the movement of the observed scene; indeed, if the movement is not well synchronized or not very regular, the addition of signals seen by the various lines will be falsified.

According to the invention a solution is proposed for producing a very fast linear sensor, having improved sensitivity and an improved signal-to-noise ratio relative to an MOS technology sensor that only had one line of pixels, but without using complex technology for the production of the pixels.

The solution according to the invention relies on the use of only two lines of pixels, operating in TDI mode but nevertheless using active pixels with charge-voltage conversion within the pixel. According to the invention, the pixels of same rank of the two lines each use a photodiode and a node for charge storage with a transfer gate adjacent to the photodiode and to the storage node so as to transfer the charge accumulated in the photodiode to the charge storage node. The storage node is shared between the two pixels of same rank, and the charge of the two photodiodes is transferred successively into this node before the reading of the potential taken by the node on account of this charge; the time interval which separates the two charge transfers corresponds substantially to the time which separates the transit of one and the same image line successively past the two lines of pixels.

Thus, the storage node internal to the pixel but common to two pixels sees the successive arrival of two packets of electrical charge, arising from two different photodiodes but which see one and the same image point in the relative movement between the observed scene and the sensor.

Consequently, it has been found that when limiting oneself to two lines of pixels, therefore to a modest gain in terms of sensitivity and signal-to-noise ratio, there is no necessity to appreciably modify the technology for producing the pixels: the latter can remain conventional MOS technology active pixels (typically pixels with one photodiode and a few transistors).

SUMMARY

Thus, the invention proposes a charge transfer image sensor operating by movement and charge integration, the sensor comprising two adjacent lines of P pixels with a view to observation of one and the same image line successively by the two lines of pixels with summation of the electrical charge generated by an image point in the two pixels of same rank of the two lines, the pixels being MOS technology active pixels comprising a photodiode, a charge storage node and means for transferring charge from the photodiode to the storage node, consisting of a transfer gate adjacent to the photodiode and to the storage node, characterized in that the charge storage node is common to the two pixels of same rank, and in that sequencing means are designed to establish a periodic cycle comprising successively a reinitialization of the potential of the storage node, a sampling of the reinitialized potential of the storage node, a first transfer of charge from the photodiode of the first pixel to the common storage node immediately after the sampling, a second transfer of charge from the photodiode of the second pixel to the storage node at the end of the periodic cycle, without reinitialization of the potential of the storage node between the two transfers, and a sampling of the potential of the storage node after the second transfer of charge.

The two charge transfers occur the one very quickly after the start of the cycle, the other very slightly before the end of the cycle. The time interval which separates them is substantially the interval during which an image line has moved between the first line of pixels and the second line of pixels. The periodic cycle time is slightly greater than this duration since the first transfer of charge cannot take place before the sampling of the reinitialized potential, and the second transfer of charge must be finished at the moment of the final sampling of the potential of the storage node.

In practice, a pixel comprises, in addition to the photodiode specific to the pixel and the storage node common to the two pixels of same rank: a respective transfer gate adjacent on one side to a respective photodiode and on the other to the common storage node, a reinitialization transistor common to the two pixels, and a reading transistor common to the two pixels.

In a first embodiment, the sensor comprises for the two pixels of same rank a reading circuit comprising only two sampling capacitors, so as to receive respectively a sample of potential of the storage node after reinitialization and a sample of potential of the storage node after the double transfer of charge. An analogue-digital converter cyclically converts the difference of the voltages stored in these capacitors.

In this case, the sequencing means execute successively and cyclically:
  at the start of a first cycle, a reinitialization of the potential of the charge storage node,
  then a sampling of the potential of the storage node in the first capacitor,
  then a total transfer of charge from the photodiode of the first pixel to the storage node,
  then, towards the end of the first cycle, a total transfer of the charge from the photodiode of the second pixel to the storage node,
  then a sampling of the potential of the storage node in the second capacitor,
  then, in the course of a second cycle, the reinitialization of the potential of the storage node and a second sampling of this potential in the first capacitor,
  and only thereafter, after the end of the first cycle, the analogue digital conversion, of the difference between the sample of first cycle stored in the second capacitor and the sample of second cycle stored in the first capacitor.

This double sampling is not a correlated double sampling.

In another embodiment, a correlated double sampling is done. The sensor comprises for the two pixels of same rank a reading circuit having three sampling capacitors, the first and the third of which are dedicated to the sampling of the potential after reinitialization whereas the second is dedicated to the sampling after the double transfer of charge.

The sequencing means then execute successively in the course of an alternation of odd cycles and even cycles:
  a) at the start of a cycle, a reinitialization of the potential of the charge storage node by the reinitialization transistor,
  b) then a sampling of the potential of the storage node in the first capacitor for an odd cycle, or of the third capacitor for an even cycle,
  c) then a total transfer of charge from the photodiode of the first pixel to the storage node,
  d) then, towards the end of the cycle, a total transfer of the charge from the photodiode of the second pixel to the storage node,
  e) then a sampling of the potential of the storage node in the second capacitor,
  f) then, in the course of the following cycle, the reinitialization of the potential of the storage node and a second sampling of this potential in the third capacitor for a following even cycle or in the first capacitor for a following odd cycle, and finally the analogue-digital conversion of the difference between the sample stored in the second capacitor in step e and the sample stored in the first or the third capacitor in step b, the roles of the first and third capacitors thus being interchanged at each cycle.

This double sampling is a correlated double sampling.

In this case provision may be made for two different embodiments: in one embodiment, there is a single analogue-digital converter for the conversion arising from the signals of a pixel, and either the first capacitor or the third capacitor is alternately connected to an input of this converter depending on the cycle in progress. The other input of the converter is linked to the second capacitor. In another embodiment, two converters are provided, one having an input connected to the first capacitor, the other having an input connected to the third capacitor, and the output of one or of the other converter is used alternately depending on the cycle in progress. In this second case, it is the alternation of the choice of converters rather than the alternation of the choice of storage in the first or the third capacitor which makes it possible to do a correlated double sampling at each cycle.

In yet another embodiment, there are two analogue-digital converters, a first and a third capacitor for tapping off respectively the first and the third samples, each of the two capacitors being linked to a first input of a respective converter, and a second and a fourth capacitor linked respectively to a second input of each of the converters so as to store the second sample in alternation one cycle out of two, one of the converters providing a conversion of the difference between the sample stored in the second capacitor and the sample stored in the first capacitor, the other converter providing a conversion of the difference between the sample stored in the fourth capacitor and the sample stored in the third capacitor.

The sequencing means are then designed to cyclically execute the following successive operations in the course of an alternation of odd cycles and even cycles:
  a) at the start of a cycle, a reinitialization of the potential of the charge storage node,
  b) then a sampling of the potential of the storage node in the first capacitor for an odd cycle, or of the third capacitor for an even cycle,
  c) then a total transfer of charge from the photodiode of the first pixel to the storage node,
  d) then, towards the end of the cycle, a total transfer of the charge from the photodiode of the second pixel to the storage node,
  e) then a sampling of the potential of the storage node in the second capacitor for an odd cycle or the fourth capacitor for an even cycle,
  f) then, in the course of the following cycle, the reinitialization of the potential of the storage node and a second sampling of this potential in the third capacitor for a following even cycle or in the first capacitor for a following odd cycle, and finally the analogue-digital conversion by the first converter during the following even cycle of the difference between the sample stored in the second capacitor and the sample stored in the first capacitor or the analogue-digital conversion during the following odd cycle by the second converter of the difference between the sample stored in the fourth capacitor and the sample stored in the third capacitor.

BRIEF DESCRIPTION OF DRAWINGS

Other characteristics and advantages of the invention will become apparent on reading the detailed description which follows and which is given with reference to the appended drawings in which.

DESCRIPTION OF EMBODIMENTS

Figure 1:
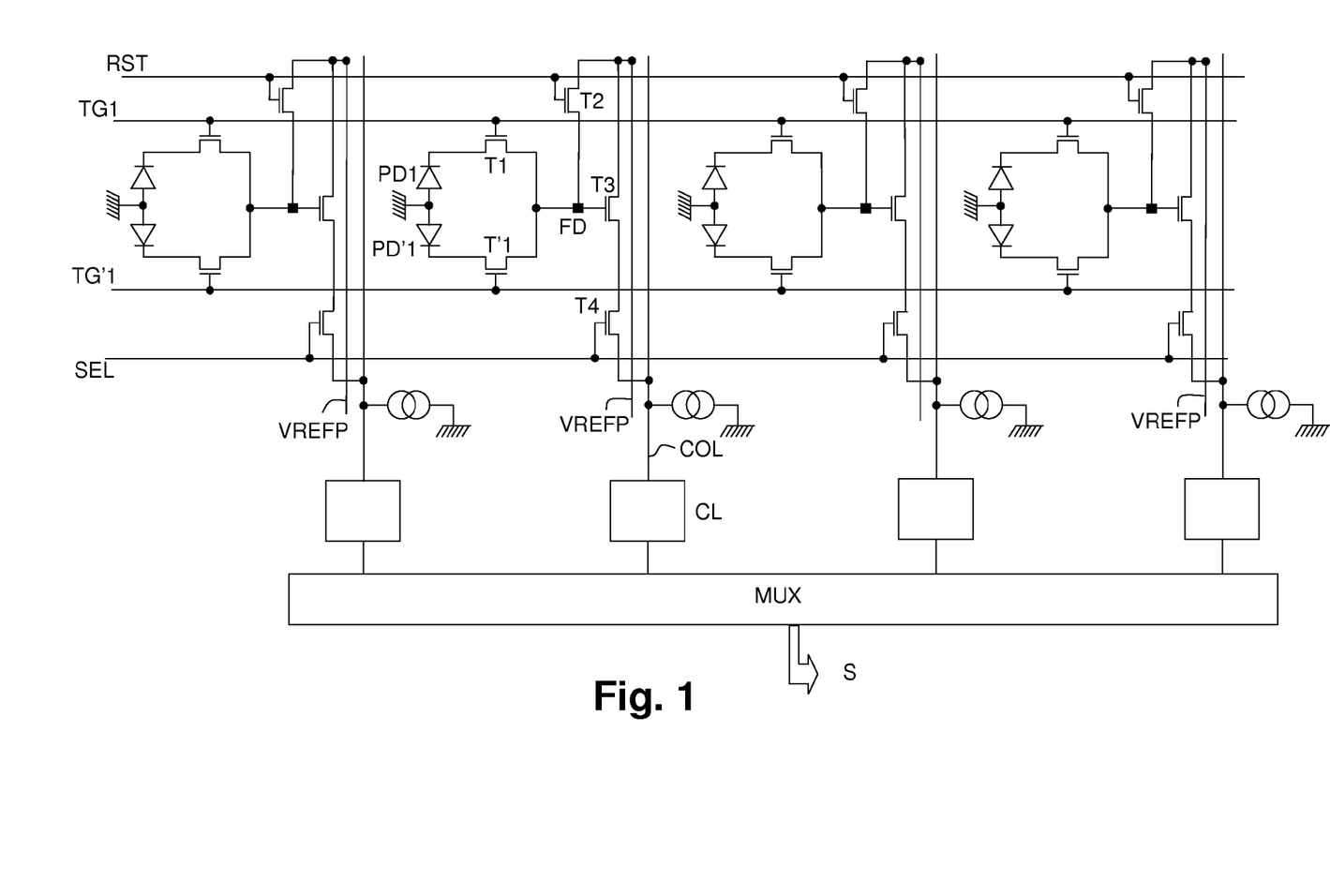
FIG. 1 represents a diagram of the organization of the pixels of a linear sensor according to the invention.

FIG. 1 represents the configuration of the pixels of the sensor according to the invention. There are two adjacent lines of pixels. The pixels of same rank in the two lines are situated alongside one another, aligned in the direction of movement of the image, from top to bottom in FIG. 1. Each pixel comprises a photodiode for converting the photons into electrical charge and a charge storage node which serves to temporarily store the charge generated so as to allow the latter to be read out thereafter.

The photodiode is preferably a so-called "pinned" photodiode, which indicates that the internal potential of the photodiode is maintained, in the absence of photogenerated charge, at a fixed value by virtue of a surface diffusion carried to the potential of the semiconductor substrate in which the photodiode is produced.

The storage node FD is a floating diffusion into which the charge may be shed and preserved for the time required to read it.

The charge storage node is shared between the two pixels of same rank belonging to the two lines. The storage node corresponding to the set of two pixels has been denoted FD. The photodiode is individual and there is therefore one photodiode per pixel, respectively denoted PD1 and PD'1 for the photodiodes corresponding to the pixels of same rank. Preferably, the physical construction is symmetric and such that the pixels are arranged on either side of their common storage node, so that it is possible to shed the charge of the two photodiodes into the same storage node situated between the two photodiodes.

The distance between the pixels of like rank, that is to say for example the distance between the centres of the photodiodes of these two pixels, is known and is the same for all the pixels in the two lines. This distance is significant for operation in TDI mode. Indeed, it will be necessary to ensure synchronism between the speed of movement of an observed scene line transiting successively past the two lines of pixels and the instants of charge transfers from the photodiodes to the storage node. The principle is in fact to shed into the storage node firstly the charge generated in the photodiode of a pixel through the observation of an image portion for a determined duration and then the charge generated in the photodiode of same rank of the other line of pixels for the same duration and while the same image point is seen by the second photodiode.

The pixels further comprise, in addition to the individual photodiode PD1, PD'1 and the common storage node FD, a respective transfer transistor T1, T'1 linking a respective photodiode PD1, PD'1 to the common storage node and making it possible to permit the transfer to the storage node of the charge of one or of the other of the photodiodes, by turning on one or the other of these transistors. The transfer transistor T1 or T'1 consists essentially of a transfer gate adjacent to the photodiode and to the storage node. The photodiode and the storage node constitute the source and the drain of the transistor. The transfer transistor T1 is controlled by a conductor TG1 common to all the pixels of the first line. The transfer transistor T'1 is controlled by a conductor TG'1 common to all the pixels of the second line of the sensor.

A transistor T2 for reinitializing the storage node, common to the two pixels, makes it possible to reinitialize the potential of the storage node to a reference potential VREFP. This transistor is controlled by control conductor RST common to all the pixels of the two lines.

A reading transistor T3, common to the two pixels, has its gate linked to the storage node and it is mounted as a voltage follower so as to make it possible to transfer onto its source a potential corresponding to the potential of the storage node. Its drain is linked to a power supply potential which may be (but not necessarily) the potential VREFP.

Finally, an activation transistor T4, common to the two pixels, makes it possible to link the source of the follower transistor T3 to a conductor termed a "column conductor" COL associated with the two pixels of like rank. There is a respective column conductor for each rank in the line. The activation transistor T4 is controlled by a conductor SEL common to all the pixels of the two lines. This transistor T4 and its control conductor are optional if the sensor comprises only two lines of pixels: the source of the reading transistor T3 could be linked directly to the column conductor. The transistor T4 could be useful if several independent groups of two lines, using the same column conductors, were formed on the sensor (the two groups not operating together in TDI mode but the two lines of a group operating in TDI mode).

The column conductor is preferably linked to a constant current source which allows the transistor T3 to behave as a voltage follower when the transistor T4 is turned on.

The charge gathered by the photodiodes and transferred to the storage node FD modifies the potential of this node and is read out on the column conductor COL associated with the two pixels of like rank. A sampling and analogue digital conversion circuit is linked to the foot of the column conductor. This circuit could be common to all the columns but in this case each column conductor would have to be routed, one after the other, to this common circuit so as to read the various pixels successively. However, it is preferred to have a respective sampling and conversion circuit CL for each column as is represented schematically in FIG. 1. The various reading circuits are linked to a multiplexer which transmits successively on a digital output S the digitized signals corresponding to the various pixels.

Several embodiments are possible as regards the reading circuit and we will commence with the simplest embodiment.

Figure 2:
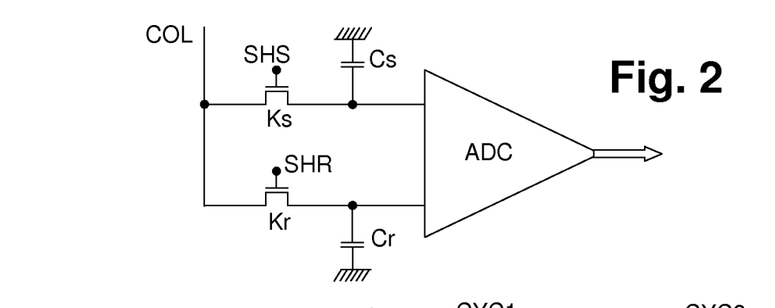
FIG. 2 represents a circuit for reading the signal arising from the pixels linked to a column conductor.

In this embodiment, as visible in FIG. 2, the reading circuit CL comprises two sampling capacitors Cr and Cs, two switches Kr and Ks, and an analogue-digital converter ADC whose inputs are linked to the two capacitors so as to convert the difference between the voltages stored in the two capacitors. The first capacitor Cr is dedicated to the sampling of the storage node reinitialization level. The second is dedicated to the sampling of the level representing the useful information regarding luminance gathered by the pixels.

Figure 3:
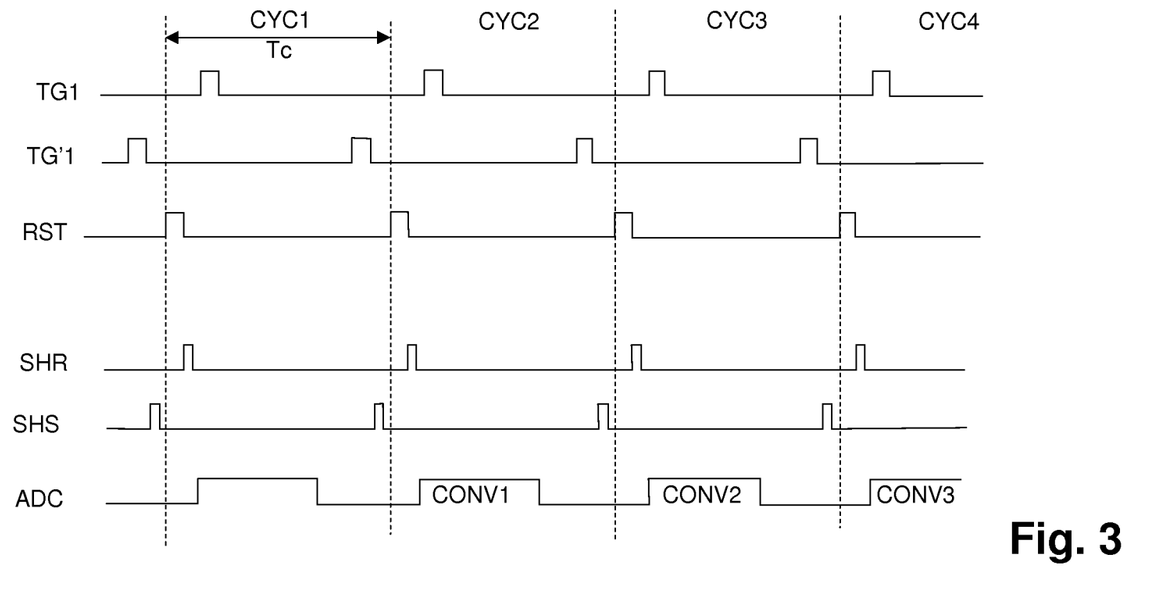
FIG. 3 represents the timechart of the signals allowing this reading.

The operating timechart in this embodiment is represented in FIG. 3. The various lines represent the control signals applied to the various conductors TG1, TG'1, RST, as well as the signals SHR and SHS applied respectively to the switches Kr and Ks.

The signals are established cyclically, with a periodicity Tc which corresponds to the speed of movement of the observed scene in front of the sensor: the cycle time Tc is the time taken by an observed scene line to pass from the first line of pixels (photodiodes PD1) to the second line of pixels (photodiodes PD'1). In general the movement will be continuous but it is also possible to envisage it being discontinuous, the scene line remaining in front of the first line of pixels for a cycle time and then moving onto the second line of pixels and remaining there for the same cycle time.

The reading cycles are visible in FIG. 3 and are numbered CYC1, CYC2, CYC3. Each cycle comprises successively the following operations:

emission of a brief pulse on the line RST for the reinitialization of the potential of the storage node FD, and consequently emptying of the charge present in this node;

emission of a brief pulse SHR for closing the switch Kr, charging in the capacitor Cr to the level of potential present on the column conductor and representing the storage node reinitialization level;

emission on the line TG1 of a brief transfer pulse turning on the transfer transistor T1; the charge integrated by the photodiode PD1 during the previous cycle (from the end of the brief pulse TG1 of the previous cycle) is shed into the storage node FD; the start of the pulse TG1 is situated slightly after the start of the cycle but nevertheless after the end of the pulse SHR;

towards the end of the cycle, very slightly before the reinitialization pulse (on the line RST) belonging to the following cycle: emission on the line TG'1 of a brief transfer pulse turning on the transfer transistor T'1; the charge integrated by the photodiode PD'1 during this cycle (from the end of the transfer pulse TG'1 of the previous cycle) is shed into the storage node FD which already contains the charge integrated in the previous cycle by the photodiode PD1;

then, as last step of the cycle, emission of a brief pulse SHS which closes the switch Ks and which samples in the capacitor Cs a level of potential representing the potential of the storage node after the double shedding of charge.

Note: the line SEL, if it exists, is activated (transistor T4 on) at least during the pulses SHR and SHS.

Thus, the sum of the charge integrated for a cycle of duration Tc by the photodiode PD1 and of the charge integrated for the following cycle of duration Tc by the photodiode PD'1 has been sampled in the capacitor Cs. As the photodiode PD'1 observes the scene with a shift corresponding to the cycle time Tc, the sum of charge does indeed correspond to the observation of one and the same image line by the two lines of photodiodes and therefore TDI mode is operative. The storage node reinitialization potential stored in the capacitor Cr serves for making a differential measurement.

The analogue-digital conversion occurs after the end of the cycle, that is to say during the following cycle. Theoretically, time ought to be available to do the analogue-digital conversion immediately after the pulse SHS but before the pulse SHR of the following cycle which follows it very closely. The time is not available in practice since these pulses are very close together. It is therefore necessary to do the analogue-digital conversion only after this second sampling pulse SHR (the durations required for the conversion CONV1, CONV2, CONV3, of FIG. 3 relate to the cycles which precede CYC1, CYC2, CYC3). Stated otherwise, the charge storage node is filled, then it is emptied and the difference is effected between the filled level and the subsequently emptied level. This therefore entails a double but uncorrelated sampling. A correlated double sampling would necessitate emptying the storage node and filling it thereafter to see what is the actual contribution due to filling. Correlated double sampling is very preferable so as to reduce the noise, termed kTC noise, which is produced by the small variations of the storage node reinitialization level at each switchover.

To allow correlated double sampling, the image sensor comprises means for storing in the course of a first cycle a first sample representing the potential of the storage node after the reinitialization of this first cycle and before the two transfers of charge of this cycle, means for storing a second sample of potential representing the potential of the storage node after the two charge transfers from the photodiodes to the storage node for this cycle, means for storing separately from the first sample and without losing the first sample a third sample representing the potential of the storage node after the reinitialization of a second cycle, and means for doing during the second cycle the analogue-digital conversion of the difference between the second and the first sample.

Two distinct capacitors are then provided to store respectively the first and the third sample so as not to lose the first sample when the third sample is gathered.

Figure 4:
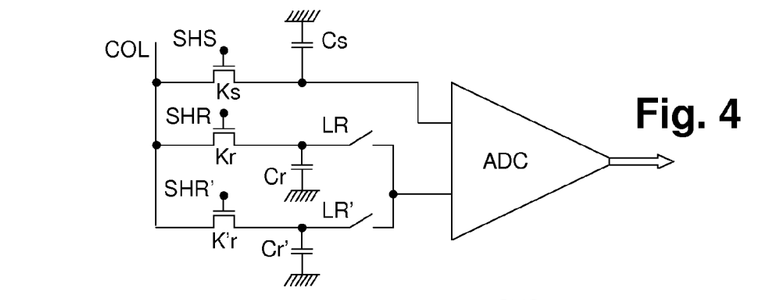
FIG. 4 represents a reading circuit variant.

FIG. 4 represents a reading circuit embodiment allowing correlated double sampling. It comprises three capacitors Cr, Cr' and Cs, switches Kr, Kr' and Ks controlled by respective signals SHR, SHR', and SHS making it possible to store the level of potential of the column conductor in the respective capacitors Cr, Cr' and Cs, and finally two switches LR and LR' connected between an input of the analogue-digital converter ADC and the capacitors Cr and Cr'.

Through this arrangement, it is possible to store a level of reinitialization potential either in the first capacitor Cr during a brief pulse SHR, or in the third capacitor Cr' during a brief pulse Cr'. The level of potential after filling of the storage node is for its part still stored in the second capacitor Cs by a pulse SHS. The capacitor Cs is linked to the other input of the converter. By choosing the actuation of the switch LR or of the switch LR', the first capacitor Cr or the third capacitor Cr' is selected with a view to converting the difference of voltages between the capacitor Cs and one of the two capacitors Cr or Cr' by choice.

Figure 5:
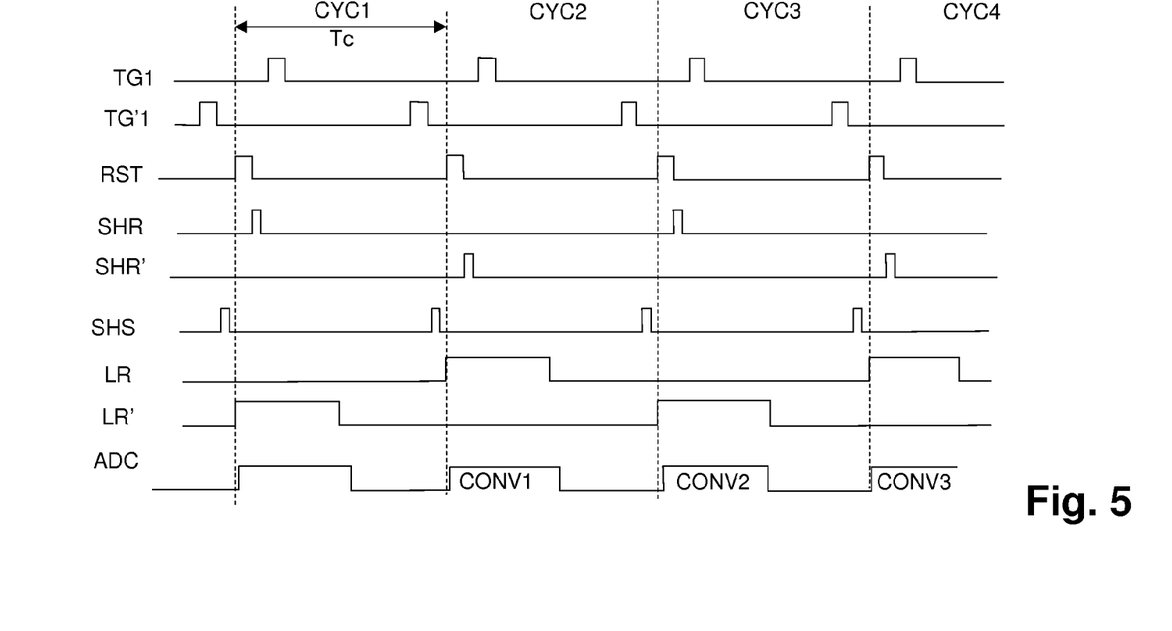
FIG. 5 represents the timechart of the signals associated with the variant of FIG. 4.

The circuit then operates with the timechart of FIG. 5, decomposed like that of FIG. 3 into successive cycles of odd and even ranks CYC1, CYC2, CYC3 of duration Tc each corresponding to the time of displacement of an image line from the first line of pixels to the second.

The first cycle comprises successively the following operations:

emission of a brief pulse on the line RST for the reinitialization of the potential of the storage node FD, and consequently emptying of the charge present in this node;

emission of a brief pulse SHR for closing the switch Kr, loading into the first capacitor Cr a level of potential present on the column conductor and representing the storage node reinitialization level;

emission on the line TG1 of a brief transfer pulse turning on the transfer transistor T1; the charge integrated by the photodiode PD1 during the previous cycle (from the end of the brief pulse TG1 of the previous cycle) is shed into the storage node FD; the start of the pulse TG1 is situated slightly after the start of the cycle but nevertheless after the end of the pulse SHR;

towards the end of the cycle, very slightly before the reinitialization pulse (on the line RST) belonging to the following cycle: emission on the line TG'1 of a brief transfer pulse turning on the transfer transistor T'1; the charge integrated by the photodiode PD'1 during this cycle (from the end of the transfer pulse TG'1 of the previous cycle) is shed into the storage node FD which already contains the charge integrated in the previous cycle by the photodiode PD1;

at the end of the cycle: emission of a brief pulse SHS which closes the switch Ks and which samples in the second capacitor Cs a level of potential representing the potential of the storage node after the double shedding of charge.

The second cycle is identical to the first except for the fact that a pulse SHR' is emitted in place of the pulse SHR, and consequently the storage node reinitialization potential is sampled in the third capacitor Cr' and not in the first Cr. The third cycle becomes like the first again. The reinitialization level is therefore stored alternately in the capacitor Cr at the odd cycles and in the capacitor Cr' at the even cycles.

At the end of the odd cycles, after emission of the pulse SHS, the analogue-digital conversion of the difference between the voltage stored in the capacitor Cs and the voltage stored in the capacitor Cr is performed. Conversely at the end of the even cycles, after the emission of the pulse SHS, the analogue-digital conversion of the difference between the voltage stored in the capacitor Cs and the voltage stored in the capacitor Cr is performed. The switch LR is therefore closed with a view to this conversion at the end of the odd cycles, whereas it is the switch LR' which is closed at the end of the even cycles with a view to the conversion.

Time is available to perform these conversions. Indeed when the information contained in the capacitor Cr is used for the conversion, switch LR closed, the fact that a new reinitialization level is sampled very quickly does not cause any impediment; the new level is sampled in the other capacitor Cr' without disturbing the level of the capacitor Cr. Conversely, at the end of an even cycle, the reinitialization of the storage node and its sampling in the capacitor Cr does not disturb the information contained in the capacitor Cr'. It is therefore possible to do a conversion with a correlated double sampling in which the difference is indeed effected between a reinitialization level and a charge fill level which follows the reinitialization and not the converse.

In the case of FIG. 4, the switches LR and LR' serve to alternately route the capacitor Cr or the capacitor Cr' towards one input of the converter, the other input always being linked to the capacitor Cs.

Figure 6:
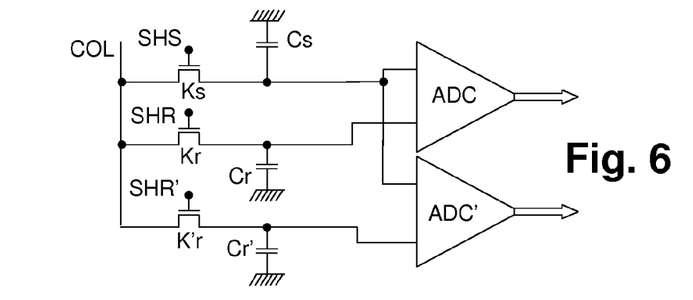
FIG. 6 represents another reading circuit variant.

In a variant embodiment represented in FIG. 6, instead of using switches LR and LR' to route either the capacitor Cr or the capacitor Cr' towards the converter alternately in the course of the successive cycles, provision may be made for the reading circuit to comprise two analogue-digital converters ADC and ADC', one of which converts the difference between the sample contained in the capacitor Cs and the sample contained in the capacitor Cr, and the other of which converts the difference between the sample contained in the capacitor Cs and the sample contained in the capacitor Cr'. The outputs of the converters ADC and ADC' are used alternately in the course of the odd and even cycles in such a way that the measurement is always made by correlated double sampling. The capacitors Cr and Cr' are then linked directly, without the switches LR and LR', to the converters.

The conversions may be systematic in the two converters with a periodicity Tc, and in this case the output of one converter is selected at the end of the odd cycle and the output of the other converter is selected at the end of the odd cycle. Or else, alternatively, the conversion is done only at the end of the odd cycles for the converter ADC and only at the end of the odd cycles for the converter ADC'.

Figures 7, 8:
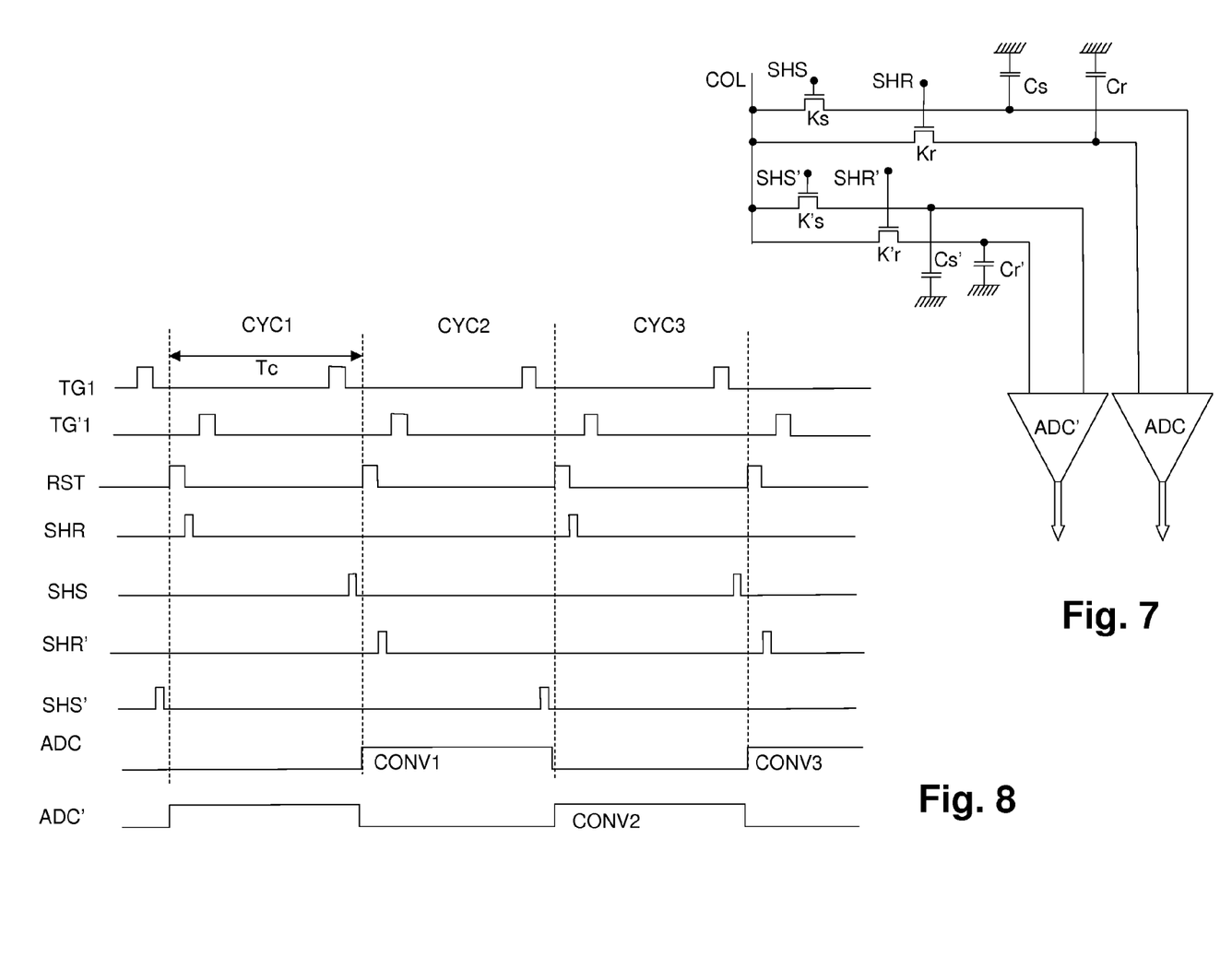
FIG. 7 represents another reading circuit variant.
FIG. 8 represents a timechart of the signals associated with the variant of FIG. 7.

In another variant embodiment represented in FIG. 7, provision is furthermore made for two converters ADC and ADC' but also two capacitors Cs and Cs' operating in alternation (like the capacitors Cr and Cr') so as to sample the useful signal one cycle out of two in one of the capacitors and then in the other. Each of the capacitors Cs and Cs' is linked to an input of a respective converter. An additional switch SHS' makes it possible to store the useful signal of the column in the capacitor Cs'.

The timechart represented in FIG. 8 then differs from that of FIG. 5 in that the sampling pulses SHS have a periodicity of two cycles (2·Tc), just like the pulses SHS', and the pulses SHS are shifted by a cycle (duration Tc) with respect to the pulses SHS'. Moreover each of the converters performs a sampling with a periodicity of two cycles. More time is therefore available to do the conversion since the conversion by one converter ADC (or ADC') does not need to be finished upon the arrival of a pulse SHS' (or SHS) intended for the capacitor Cs' (or Cs) connected to the other converter. The conversion by one of the converters may moreover begin before the conversion performed by the other has finished.

The invention claimed is:

1. A charge transfer image sensor operating by movement and charge integration, the sensor comprising:
    two adjacent lines of pixels with a view to observation of one and the same image line successively by the two adjacent lines of pixels with summation of the electrical charge generated by an image point in the two pixels of same rank of the two lines, the pixels being MOS technology active pixels comprising a photodiode, a charge storage node and a gate configured to transfer charge from the photodiode to the storage node,
    a first storing device configured to store in the course of a first cycle a first sample representing the potential of the storage node after the reinitialization of this first cycle and before the two transfers of charge of this cycle,
    a second storing device configured to store a second sample of potential representing the potential of the storage node after the two charge transfers from the photodiodes to the storage node for this cycle,
    a third storing device configured to store separately from the first sample, and without losing the first sample, a third sample representing the potential of the storage node after the reinitialization of a second cycle,
    a device configured to effect during the second cycle the analogue-digital conversion of the difference between the second and the first sample,
    two analogue-digital converters,
    a first and a third capacitor for tapping off respectively the first and the third samples, each of the two capacitors being linked to a first input of a respective converter, and
    a second capacitor linked to a second input of each of the converters for storing the second sample, the converters being used alternately in the course of the successive cycles to provide a conversion of the difference between the sample stored in the second capacitor and the sample stored in the first or the third capacitors,
wherein the gate is adjacent to the photodiode and to the storage node,
wherein the charge storage node is common to the two pixels of same rank, and
wherein a sequencing device is configured to establish a periodic cycle comprising successively
a reinitialization of the potential of the storage node,
a sampling of the reinitialized potential of the storage node,
a first transfer of charge from the photodiode of the first pixel to the common storage node immediately after the sampling, then
a second transfer of charge from the photodiode of the second pixel to the storage node at the end of the periodic cycle, without reinitialization of the potential of the storage node between the two transfers, wherein a time interval which separates the first transfer and the second transfer is substantially the interval during which the observed image line has moved between the two adjacent lines of pixels, and
a sampling of the potential of the storage node after the second transfer of charge.

2. The sensor according to claim 1, wherein the sequencing device is configured to cyclically execute the following successive operations in the course of an alternation of odd cycles and even cycles:
a) at the start of a cycle, a reinitialization of the potential of the charge storage node,
b) then a sampling of the potential of the storage node in the first capacitor for an odd cycle, or of the third capacitor for an even cycle,
c) then a total transfer of charge from the photodiode of the first pixel to the storage node,
d) then, towards the end of the cycle, a total transfer of the charge from the photodiode of the second pixel to the storage node,
e) then a sampling of the potential of the storage node in the second capacitor,
f) then, in the course of the following cycle, the reinitialization of the potential of the storage node and a second sampling of this potential in the third capacitor for a following even cycle or in the first capacitor for a following odd cycle, and finally the analogue-digital conversion of the difference between the sample stored in the second capacitor in step e and the sample stored in the first or the third capacitor in step b, the roles of the first and third capacitors thus being interchanged at each cycle.

3. The sensor according to claim 1, wherein each pixel comprises, in addition to the photodiode specific to the pixel and the storage node common to the two pixels of same rank: a respective transfer transistor between each photodiode and the common storage node, a reinitialization transistor common to the two pixels, having its source linked to the storage node, and a reading transistor common to the two pixels and having its gate linked to the storage node.

4. A charge transfer image sensor operating by movement and charge integration, the sensor comprising:
two adjacent lines of pixels with a view to observation of one and the same image line successively by the two adjacent lines of pixels with summation of the electrical charge generated by an image point in the two pixels of same rank of the two lines, the pixels being MOS technology active pixels comprising a photodiode, a charge storage node and a gate configured to transfer charge from the photodiode to the storage node,
a first storing device configured to store in the course of a first cycle a first sample representing the potential of the storage node after the reinitialization of this first cycle and before the two transfers of charge of this cycle,
a second storing device configured to store a second sample of potential representing the potential of the storage node after the two charge transfers from the photodiodes to the storage node for this cycle,
a third storing device configured to store separately from the first sample, and without losing the first sample, a third sample representing the potential of the storage node after the reinitialization of a second cycle,
a device configured to effect during the second cycle the analogue-digital conversion of the difference between the second and the first sample,
a first and a third distinct capacitors for storing respectively the first and the third samples,
a switching device configured to alternately link one or the other of the two capacitors to an input of an analogue-digital converter in the course of successive cycles, and
a second capacitor linked to another input of the converter for storing the second sample, the first sample being stored alternately in one and then in the other of the first two capacitors in the course of the successive cycles,
wherein the gate is adjacent to the photodiode and to the storage node,
wherein the charge storage node is common to the two pixels of same rank,
wherein a sequencing device is configured to establish a periodic cycle comprising successively
a reinitialization of the potential of the storage node,
a sampling of the reinitialized potential of the storage node,
a first transfer of charge from the photodiode of the first pixel to the common storage node immediately after the sampling, then
a second transfer of charge from the photodiode of the second pixel to the storage node at the end of the periodic cycle, without reinitialization of the potential of the storage node between the two transfers, wherein a time interval which separates the first transfer and the second transfer is substantially the interval during which the observed image line has moved between the two adjacent lines of pixels, and
a sampling of the potential of the storage node after the second transfer of charge, and
wherein the sequencing device is configured to cyclically execute the following successive operations in the course of an alternation of odd cycles and even cycles:
a) at the start of a cycle, a reinitialization of the potential of the charge storage node,
b) then a sampling of the potential of the storage node in the first capacitor for an odd cycle, or of the third capacitor for an even cycle,
c) then a total transfer of charge from the photodiode of the first pixel to the storage node,
d) then, towards the end of the cycle, a total transfer of the charge from the photodiode of the second pixel to the storage node,
e) then a sampling of the potential of the storage node in the second capacitor,
f) then, in the course of the following cycle, the reinitialization of the potential of the storage node and a second sampling of this potential in the third capacitor for a following even cycle or in the first capacitor for a following odd cycle, and finally the analogue-digital conversion of the difference between the sample stored in the second capacitor in step e and the sample stored in the first or the third capacitor in step b, the roles of the first and third capacitors thus being interchanged at each cycle.

5. The sensor according to claim 4, wherein each pixel comprises, in addition to the photodiode specific to the pixel and the storage node common to the two pixels of same rank: a respective transfer transistor between each photodiode and the common storage node, a reinitialization transistor common to the two pixels, having its source linked to the storage node, and a reading transistor common to the two pixels and having its gate linked to the storage node.

6. A charge transfer image sensor operating by movement and charge integration, the sensor comprising:
two adjacent lines of pixels with a view to observation of one and the same image line successively by the two adjacent lines of pixels with summation of the electrical charge generated by an image point in the two pixels of same rank of the two lines, the pixels being MOS technology active pixels comprising a photodiode, a charge storage node and a gate configured to transfer charge from the photodiode to the storage node,
a first storing device configured to store in the course of a first cycle a first sample representing the potential of the storage node after the reinitialization of this first cycle and before the two transfers of charge of this cycle,
a second storing device configured to store a second sample of potential representing the potential of the storage node after the two charge transfers from the photodiodes to the storage node for this cycle,
a third storing device configured to store separately from the first sample, and without losing the first sample, a third sample representing the potential of the storage node after the reinitialization of a second cycle,
a device configured to effect during the second cycle the analogue-digital conversion of the difference between the second and the first sample,
two analogue-digital converters,
a first and a third capacitor for tapping off respectively the first and the third samples, each of the two capacitors being linked to a first input of a respective converter, and
a second and a fourth capacitor linked respectively to a second input of each of the converters so as to store the second sample in alternation one cycle out of two, one of the converters providing a conversion of the difference between the sample stored in the second capacitor and the sample stored in the first capacitor, the other converter providing a conversion of the difference between the sample stored in the fourth capacitor and the sample stored in the third capacitor,
wherein the gate is adjacent to the photodiode and to the storage node,
wherein the charge storage node is common to the two pixels of same rank, and
wherein a sequencing device is configured to establish a periodic cycle comprising successively
a reinitialization of the potential of the storage node,
a sampling of the reinitialized potential of the storage node,
a first transfer of charge from the photodiode of the first pixel to the common storage node immediately after the sampling, then
a second transfer of charge from the photodiode of the second pixel to the storage node at the end of the periodic cycle, without reinitialization of the potential of the storage node between the two transfers, wherein a time interval which separates the first transfer and the second transfer is substantially the interval during which the observed image line has moved between the two adjacent lines of pixels, and
a sampling of the potential of the storage node after the second transfer of charge.

7. The sensor according to claim 6, wherein the sequencing device is configured to cyclically execute the following successive operations in the course of an alternation of odd cycles and even cycles:
a) at the start of a cycle, a reinitialization of the potential of the charge storage node,
b) then a sampling of the potential of the storage node in the first capacitor for an odd cycle, or of the third capacitor for an even cycle,
c) then a total transfer of charge from the photodiode of the first pixel to the storage node,
d) then, towards the end of the cycle, a total transfer of the charge from the photodiode of the second pixel to the storage node,
e) then a sampling of the potential of the storage node in the second capacitor for an odd cycle or the fourth capacitor for an even cycle,
f) then, in the course of the following cycle, the reinitialization of the potential of the storage node and a second sampling of this potential in the third capacitor for a following even cycle or in the first capacitor for a following odd cycle, and finally the analogue-digital conversion by the first converter during the following even cycle of the difference between the sample stored in the second capacitor and the sample stored in the first capacitor or the analogue-digital conversion during the following odd cycle by the second converter of the difference between the sample stored in the fourth capacitor and the sample stored in the third capacitor.

8. The sensor according to claim 6, wherein each pixel comprises, in addition to the photodiode specific to the pixel and the storage node common to the two pixels of same rank: a respective transfer transistor between each photodiode and the common storage node, a reinitialization transistor common to the two pixels, having its source linked to the storage node, and a reading transistor common to the two pixels and having its gate linked to the storage node.

* * * * *